(12) United States Patent
Sachse et al.

(10) Patent No.: US 11,507,525 B2
(45) Date of Patent: Nov. 22, 2022

(54) HIGH SPEED COMMUNICATION SYSTEM

(71) Applicant: Melexis Technologies NV, Tessenderlo (BE)

(72) Inventors: Eric Sachse, Dresden (DE); Torsten Bacher, Dresden (DE); Thomas Freitag, Erfurt (DE)

(73) Assignee: MELEXIS TECHNOLOGIES NV, Tessenderlo (BE)

(*) Notice: Subject to any disclaimer, the term of this patent is extended or adjusted under 35 U.S.C. 154(b) by 0 days.

(21) Appl. No.: 17/362,226

(22) Filed: Jun. 29, 2021

(65) Prior Publication Data
US 2021/0406210 A1 Dec. 30, 2021

(30) Foreign Application Priority Data

Jun. 30, 2020 (EP) .................... 20183039

(51) Int. Cl.
*G06F 13/362* (2006.01)
*G06F 13/40* (2006.01)
*G06F 13/42* (2006.01)

(52) U.S. Cl.
CPC ........ *G06F 13/362* (2013.01); *G06F 13/4027* (2013.01); *G06F 13/4063* (2013.01); *G06F 13/42* (2013.01)

(58) Field of Classification Search
CPC .... G06F 13/362; G06F 13/4027; G06F 13/42; G06F 13/4063
USPC ...................................................... 710/117
See application file for complete search history.

(56) References Cited

U.S. PATENT DOCUMENTS

| | | | |
|---|---|---|---|
| 7,801,053 B2* | 9/2010 | Brocke | H04L 12/40058 370/257 |
| 10,547,477 B2* | 1/2020 | Nguyen | H04L 12/403 |
| 2003/0115369 A1 | 6/2003 | Walter et al. | |
| 2015/0308998 A1* | 10/2015 | Suzuki | G01M 3/00 73/31.05 |
| 2019/0199558 A1 | 6/2019 | Nguyen et al. | |
| 2020/0195415 A1 | 6/2020 | Evans | |

OTHER PUBLICATIONS

Extended Search Report from corresponding EP Application No. EP20183039.5, dated Nov. 16, 2020.

* cited by examiner

*Primary Examiner* — Brian T Misiura
(74) *Attorney, Agent, or Firm* — Workman Nydegger

(57) ABSTRACT

A method for communicating between a master and a plurality of slaves includes generating a communication frame including generating a slave data frame in each slave. The slave data frame has a data packet including one or more data bytes and at least one gap of variable time length comprising no information in the slave data frame. The gap may be at the beginning of said slave data frame before the beginning of the first data byte of said data packet and/or at the end of said data packet after the end of a last data byte of said data packet, where the gaps have a time length dependency based on parameters locally stored in each of said at least one slave. The slave data frame is transmitted sequentially where the gap increases for each subsequent slave.

12 Claims, 8 Drawing Sheets

HIGH SPEED COMMUNICATION SYSTEM

FIELD OF THE INVENTION

The invention relates to the field of data communication. More specifically it relates to master-slave communication.

BACKGROUND OF THE INVENTION

Existing network systems typically provide connection between different electronic elements and their controllers by Local Interconnect Network (LIN) or Controller Area Network (CAN) systems, or other systems, and a communication protocol is established between them.

For example, in automotive applications, several bus systems are already in place. A LIN network for instance connects several slaves to a master unit. However, the bandwidth limit is around 20 kbaud which is not satisfactory for many applications. Despite this, a LIN bus is seen as a cost-efficient solution. Other bus systems, such as CAN bus, ethernet bus, or a network based on Flexray, are fast communication interfaces. However, the network implementation is relatively costly. The example of CAN is complex, difficult to repair or interchange in case of failure or accident, and the implementation is expensive.

SUMMARY OF THE INVENTION

It is an object of embodiments of the present invention to provide a method and system which allows communication between one or more slaves and a master allowing the transmission of data packets with no overlap, in an inexpensive and flexible way.

In a first aspect, the present invention provides a method for communicating between a master and at least one slave, comprising generating a communication frame including generating a slave data frame. The slave data frame comprises a data packet comprising one or more data bytes, and at least one gap of variable time length comprising no information in the slave data frame, at the beginning of said slave data frame before the beginning of the first data byte of said data packet, or at the end of said data packet after the end of a last data byte of said data packet. The gaps have a time length dependency based on parameters locally stored in each of said at least one slave. Information is conveyed between a start and end bits, and the gaps are outside the data packet. It is an advantage of embodiments of the present invention that high speed communication is enabled by allowing a variable length gap being introduced by each slave in the communication, thus avoiding data collisions between the different network members due to oscillator mismatches.

In some embodiments of the present invention, generating the slave data frame comprises generating a first gap and a second gap of variable time length, at the beginning respectively the end of said data packet. It is an advantage of embodiments of the present invention that the implementation is flexible for different frequency offsets.

In some embodiments of the present invention, one of said parameters locally stored in each of said at least one slave is a slave ID number, being a unique identification of each slave. It is an advantage of embodiments of the present invention that each slave can use its own ID to provide a unique gap time length and simultaneously to obtain the moment at which the data frame can start being transmitted to a master, with no communication between slaves, hence allowing a protocol simpler than CAN protocol to be used, e.g. a (modified) UART protocol.

In some embodiments of the present invention, the method further comprises generating a time base used for calculating the at least one gap, where the timing of the slave data frame is based on a clock with tolerance of the nominal target frequency being under 5%. It is an advantage of embodiments of the present invention that the slave or slaves may use an inexpensive and less precise RC oscillator clock, enabling high speed communication at low cost.

In some embodiments of the present invention, the method further comprises generating and sending a start of byte (SOB) information with the first data bit further comprising data direction exchange information, which allows differentiating whether a byte is a data request by the master or a byte containing data sent by the slave.

In some embodiments of the present invention, the parameters are provided in at least one calibration step. It is an advantage of embodiments of the present invention that the slave can be programmed at any time, e.g. the duration of the gap can be programmed at any time, e.g. when switching the sensor for the first time, during manufacturing. Some of the parameters, e.g. fixed parameters, can be hard coded on a ROM, like nominal data rate, nominal RCO frequency.

In some embodiments of the present invention, generating the data frame comprising at least one gap is performed during initialization routine of the sensor. It is an advantage of embodiments of the present invention that drift, e.g. long term drift of the slave or its oscillator, e.g. aging, etc., can be at least partially compensated.

In some embodiments of the present invention, the method further comprises obtaining the frequency offset of each slave, subsequently including a predetermined bus delay for slaves with negative frequency offset and not including the bus delay for slaves with positive frequency offset. It is an advantage of embodiments of the present invention that additional margin for collision avoidance can be introduced.

In a further aspect, the present invention provides a software program product which is adapted to carry out the method of the previous aspect when executed in a processing unit of a slave connected to a master. Said software program may be implementable in each slave of a system.

In a further aspect, the present invention provides a system for communicating between a master and at least one slave. The at least one slave is adapted to generate a slave data frame comprising a data packet comprising one or more data bytes, and at least one gap of variable time length comprising no information in the slave data frame, at the beginning of said slave data frame before the beginning of the first data byte of said data packet, or at the end of said data packet after the end of a last data byte of said data packet. The system is adapted to calculate the gaps having a time length dependency based on parameters locally stored in each of said at least one slave. The system further comprises a master adapted to receive the slave data frame.

In some embodiments of the present invention, the master comprises a clock with a tolerance of under 0.05% while the slaves comprise a clock with lower precision than the clock of the master, for providing a high speed and cost-efficient system. It is an advantage of embodiments of the present invention that the system is inexpensive, as the slaves may have inexpensive oscillators, while at the same time avoiding collisions.

In some embodiments of the present invention, the at least one slave is a sensor and the master is a master control unit.

In some embodiments of the present invention, the system may be adapted to run the software program in accordance with an aspect of the present invention.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
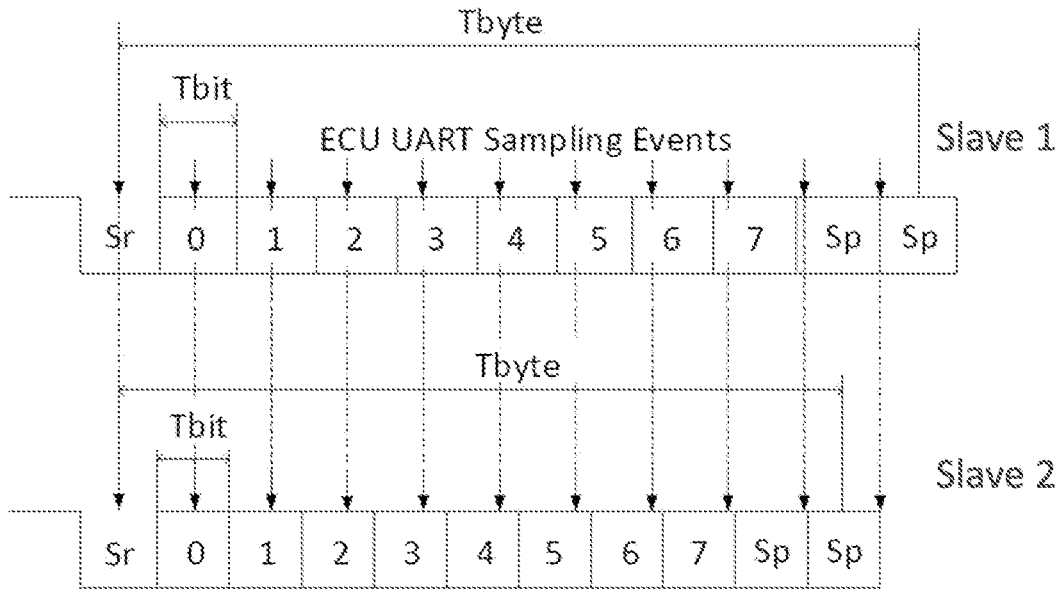
FIG. 1 illustrates an existing UART bit transmission of a fast and slow slaves compared with the UART sampling events of the master.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. The term "comprising" therefore covers the situation where only the stated features are present and the situation where these features and one or more other features are present. Thus, the scope of the expression "a device comprising means A and B" should not be interpreted as being limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to a "master", reference is made to a master unit, being an electronic unit that generates commands to control one or more electronic units referred to as "slaves" or "slave units". Usually the master is a controller and has processing power, for example it may be a control unit, usually called master control unit or MCU. In the following description, although "electronic control unit" or ECU will be often mentioned, in general any control unit (e.g. a processor) can be used as master. There is interchange of information and commands between slaves and master. For example, slaves may transmit information to the receiving master.

In the following, reference will be made to 'frequency offset', which is defined as the difference between the real frequency (Fr) of the slave and its nominal frequency (Fnom), so the offset is obtained as Fr−Fnom. It is noted also that the slaves should run at the same frequency as the master, so the nominal frequency Fnom and the frequency of the master Fmas are chosen to be the same. Thus, the offset can also be in terms of the real slave frequency and the master frequency, as Fr−Fmas. This is the reason why the master requires a very accurate oscillator, so the real frequency of the master is in practice the same as its nominal frequency. The frequency offset of a slave can be positive, when the real frequency is higher than the nominal frequency, so the slave is faster than it is supposed to be (faster than the master), or negative, when the actual frequency is lower than its nominal frequency, so the slave is slower than it should. The difference between the most positive and the most negative frequency offset defines the tolerance band, in which the communication must work.

The present invention relates to information exchange and communication between nodes. The communication allows sending a slave data frame to another unit, typically a master unit, with reduced bus collisions or electromagnetic compatibility (EMC) problems.

The present invention can be applied to any system which requires bus communication between electronic elements known as nodes, where one node may be a control unit (e.g. ECU) acting as a master and at least one further node may be a slave, for example sensors, e.g. current sensors or position sensors. However, it can be applied to systems where a slave is a memory or register of any module or sub-system, or where a slave is an actuator, or a light node in an illumination system, or the like. In some embodiments, the invention can be applied to systems where a master initiates a data transfer from one or more slaves to the master. For example, the master may send control commands to the actuators to settle in a given position, which is interpreted by the actuator as a trigger. After the position is settled, the actuators may communicate back to the master a status information in accordance with embodiments of the present invention. In some embodiments, the data sent to the master may be diagnostic information.

The data transmitted between nodes, in particular from a slave to a master, needs to be timed, for which several signals are interchanged between them. The signals are sent as bits, organized in data packets. The data packets are grouped in data frames, forming a communication frame. The communication frame includes data frames sent by a master and data frames sent by one or more slaves. The data frames are usually sent by the slaves upon request from the master. There is a risk of overlapping frames, or collision, or in general desynchronization of the communication, for example between a master and a slave and/or several slaves which are required to send data. In order to reduce chance of data frame collision, synchronization bits are sent by the master. Data collision can be reduced or avoided by allowing communication between slaves, but this requires complex communication protocols. Some solutions include careful synchronization between the master and the slave, in order to avoid desynchronization between them.

The communication can be performed in a Universal Asynchronous Receiver Transmitter (UART) system. FIG. 1 shows an example of existing communication in an UART where the master ECU samples two slave sensors. Because the slaves have their own electronic components separate from the master, it may occur that a slave runs at a higher speed than the master, or at lower speed. In the particular example of FIG. 1, the communication is initiated with e.g. one or more start bits Sr, followed by 8 data bits 0 . . . 7, followed by one or more stop bits Sp. These bits signalize the respective start and stop of the transmission and help detect failures in transmission or the like.

The set (e.g. octet) of data bits, the start bit or bits and the stop bit and bits are transmitted in a byte time (Tbyte) through the bus. The time it takes the slave to transmit each of these bits is the bit time (Tbit) is called bit time. It can be defined as the duration of a bit at a single point in the system, so additional times (delays, processing time in physical layers, transfer times, etc. are not included). Further, the byte time might be defined as the time between the middle of the 1st start bit and the middle of the last stop bit. It also could be defined as a time between the rising edges or the falling edges of these bits or any other moment in the bit time of these bits as for instance 25% or 75% of a bit time of these bits. In any case, the transmission of the data starts from the start of transmission by each slave. The slaves, being different electronic elements from each other and from the master, need somehow to synchronize between each other in order to avoid transmitting bits simultaneously, which would create data collision and other EMC problems. FIG. 1 shows sampling of a byte in a predetermined time (Tbyte) where the ECU UART sampling events are fixed. More in detail, the ECU UART Sampling Events for the bit stream on the bus are provided by the ECU, being a master in the communication system, and the sampling events are highly precise, for example they may run on a time base derived by a precise clock, such as a dielectric resonator or a crystal oscillator clock with e.g. +/−0.02% tolerance of the nominal crystal oscillator frequency.

The problems in lagging shown in FIG. 1 may be the cause of collisions, in particular when several slaves send their data sequentially to one master. In order to solve this, each slave may include precise clocks. Hence Fnom=Fr=Fmas. However this is not cost-efficient. Typically, the slaves connected to the bus run at a low precise oscillator frequency with a tolerance of their nominal oscillator frequencies higher, e.g. orders of magnitude higher, than the precision clock of the master.

This causes the duration of the sampling events being slightly different from the transmission time of each bit (Tbit) from a slave sensor. At worst case, there might be slaves running on the low frequency of this tolerance band, meaning that their MUART is running slow ("slow slave", showing negative frequency offset) compared to other slaves running on their nominal frequency or on the high frequency of this tolerance band, thus with fast MUART ("fast slaves", with positive frequency offset). The case of a slow slave (Sensor 1) and a fast slave (Slave 2) are shown respectively on top and bottom of FIG. 1, the Sensor 1 being a slow slave with a Tbit of 253.5 nanoseconds and a Tbyte of 2535.0 ns, and the Sensor 2 being a fast slave, running a fast MUART, with a Tbit of 240.0 ns and a Tbyte of 2400 ns. It can easily be seen that the bits of a UART byte are slipping away from the ECU UART. The bit transmission starts lagging behind the ECU UART Sampling Events for slow slaves, while the transmission starts rushing over the ECU UART Sampling Events for fast slaves, due to frequency mismatches of the oscillators. This may cause a failure of communication at a first or at one of the following UART bytes of a UART frame, as the mismatch is cumulative. When several bytes are sent, EMC problems may arise for at least one slave. For more than one slave, both running at different clocking speeds due to clock mismatches, there may be data collision.

Although the clock mismatching can be reduced by calibration and synchronization, the problem persists. For example, an RC oscillator may have very high tolerances (e.g. +/−15%, or even up to +/−60%) but this variation can be reduced to +/−5% or lower, e.g. +/−2.5% or +/−1% (which is still higher than a much more expensive crystal oscillator). The reduced tolerance band (e.g. of +/−2.5%) of the RC oscillators ensures that at least one data byte of a sensor will be transmitted without a failure. The combination of a physical layer with an asynchronous interface gives the advantage that each data byte is "resynchronized" with each start bit sampling. However, the transmission of another data packet by another sensor might cause data collision on the bus, because the sensors are not synchronized to each other and the time budget for the given data packet transmission is not met.

The present invention aims at solving this issue, by grouping the data bytes in data packets including at least one data byte, and adding a period of time where no information is sent, with a duration established individually by each slave by parameters stored therein. This time, or gap, may occur before transmission of the data bytes, after, or both, depending on the frequency offset (whether the slave is slow or fast). Therefore, it is of advantage to split the data packet in consecutive UART bytes for re-synchronization, with higher frequency offsets, not at the level of bits, but at level of data packets. Calculation of slave time slots is based on the frequency offsets with a stable communication (e.g. a single UART) with data collision avoidance The present invention will be explained on the basis of the well known UART communication system, which is enhanced by special features to enable a high speed communication between the master and the slaves. The present invention is not limited to UART.

The present invention may provide a master which uses a precise clock, whereas the slaves can use cost-efficient RC oscillators with a lower precision than the clock of the master. Such an architecture can for instance be a sensor network in which different sensors communicate their sensing information to an electronic control unit ECU. Because of the use of cost-efficient RC oscillators at the slaves and an enhanced UART as base for the communication, the whole system will enable a high speed communication at low costs.

In the following, a slave-master communication method, a system comprising slaves adapted to carry out the method and a bus protocol are disclosed, which provide a flexible communication network for robust and fast transmission of signals, with reduced data collision.

In a first aspect, a method of transmitting signals from one or more slaves to a master is provided, for example transmitting data from sensors to a controller which generates a response based on the received data. Further, the method may be a method of data transmission from sensors to an ECU, e.g. from position or current sensors of a brushless DC motor to the ECU which controls the brushless DC motor.

Figure 2:
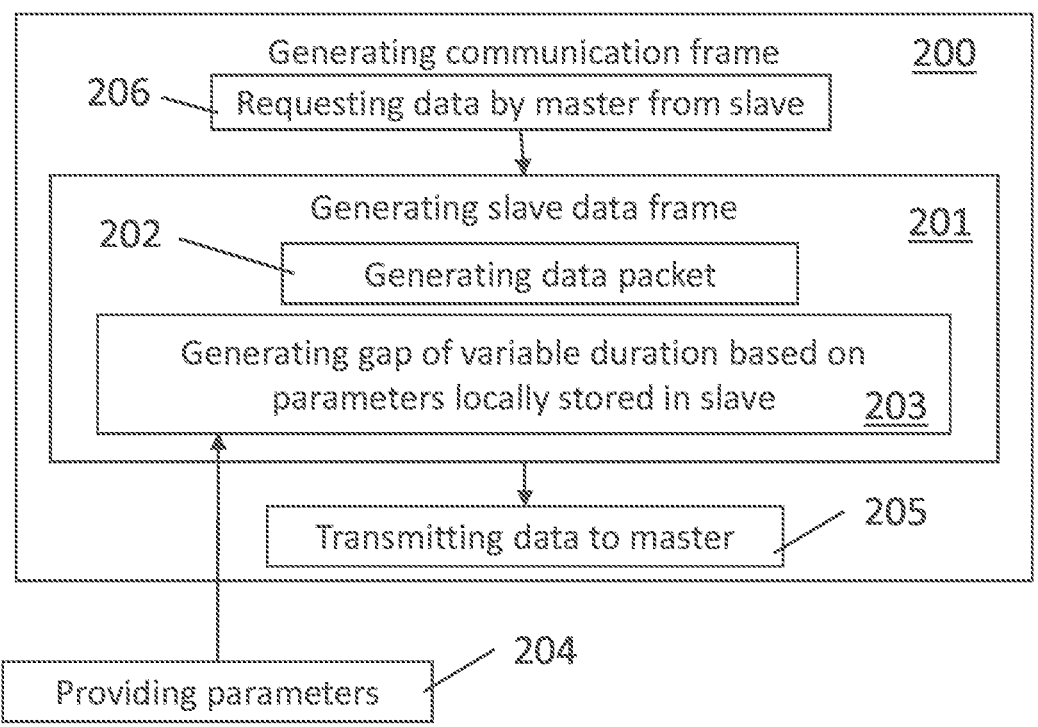
FIG. 2 is a schematic chart with method steps in accordance with embodiments of the present invention.

FIG. 2 shows an exemplary flowchart illustrating steps of the method in accordance with embodiments of the present invention. The method includes generating (200) a communication frame which includes signals sent by the master (request signals, including e.g. synchronization signals) and data signals transmitted from the slaves to the master. The method comprises generating (201) slave data frame at the request of the master, e.g. upon receipt of a request generated (206) by the master and sent to each slave (or to the slave, if there is only one slave). Generating (201) the data frame includes generating (202) the data packet, including generating (203) at least one gap where no information is sent, after, before or after and before sending (205) the data packet. This is done in each slave.

More in detail, each data frame includes one or more sets of bits, called bytes, forming the data packet. A given slave transmits (205) the relevant information in data packets at a predetermined moment in time and with a clocking signal which may not be the same as the sampling signal of the master. Information usually starts with a start bit and ends with an end bit. In order to ensure that there is no data collision with precedent or posterior transmissions, the data frame includes buffer time, or gap, where no information is being sent. Thus, the transmission of the data packet starts after a predetermined time from the receipt of a synchronization signal sent by the master. This predetermined time includes synchronization items, or a time gap, which resolves timing mismatches in the transmission of the data frames between master and slaves in the communication. In embodiments of the present invention, the gap may take place before the meaningful data packet of data bytes is sent, or after, or both before and after. This will depend whether the slave is fast or slow, and in some embodiments also on the order of data transmission. The gap is obtained from parameters which can be provided (204) per slave.

The present method can be easily applied on any digital asynchronous interface. Typically, these have to cope with a frequency mismatch between transmitter (TX—e.g. sensors or slaves) and receiver (RX—e.g. ECU or master). In embodiments of the present invention, the method is applied in a UART protocol, and it may include the features known in the art. For example, it may be an asynchronous protocol (UART) with start (low bit) and stop (one or two high bits) indication. Advantageously, the receiver (master) has only to cope with TX-RX-frequency offset within a single UART frame.

Figure 3:
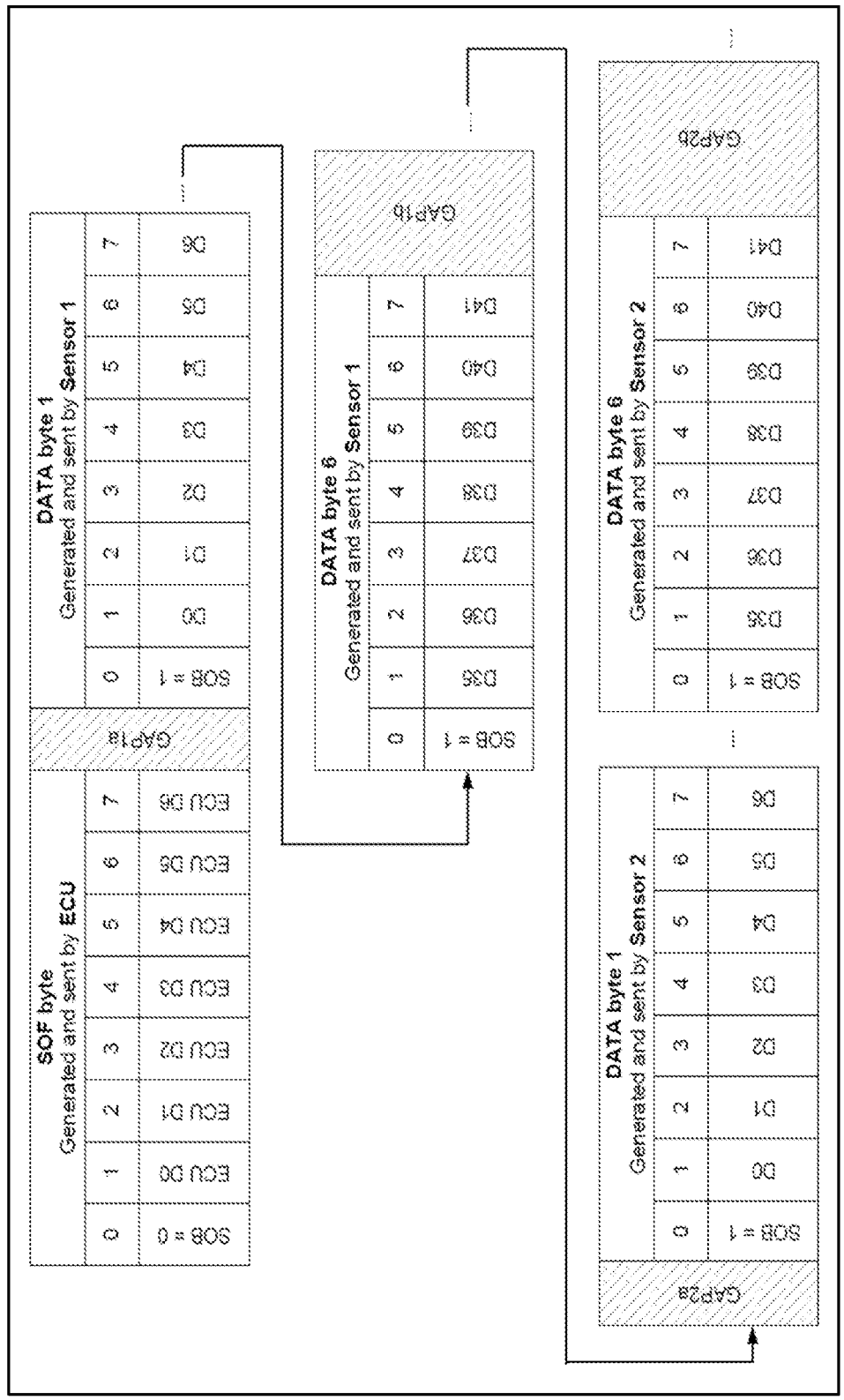
FIG. 3 illustrates a communication frame in accordance with embodiments of the present invention.

In embodiments of the present invention, the method may be applied in a triggered time division multiple access (TDMA) frame. FIG. 3 shows an exemplary communication frame as provided in embodiments of the present invention. Time gaps are included during the slave transmission of the data frame, which reduce EMC problems. Further, the present invention ensures collision-free transmission of data from several (two or more) slaves (sensors, transmitters) to the master (ECU, receiver). The communication frame of FIG. 3 comprises:

A master data frame, generated and sent by the master. In some embodiments, the master data frame includes a "start of frame" (SOF) byte. In some embodiments, the master data frame comprises a synchronization pulse.

One or more slave data frames generated and sent by one or more slaves, in an order dependent on a slave ID number, so for example a slave with ID=2 is programmed to transmit after the slave with ID=1.

Each slave data frame comprises a data packet comprising one or more data bytes, for example with sensor information, to be transmitted to the master. The present invention includes a gap containing no information in at least one data frame.

In some embodiments, the gap may be present at the beginning of said slave data frame before the beginning of the first data byte of said data packet. In some embodiments, the gap may be included at the end of said data packet after the last data byte of said data packet. In some embodiments, there is a gap at the beginning and a second gap at the end of the data packet.

The gap or gaps have a duration or time length dependency based on parameters locally stored in each of said at least one slave. In some embodiments, a parameter used to calculate the duration, in order to generate (203) the gap, includes the slave ID number, which is unique for each slave.

More in detail, with reference to FIG. 3, the communication between a master and 2 sensors (slaves) is shown. The $1^{st}$ data byte is generated by the master with ECU D0 . . . ECU D6. This is the start of frame (SOF) byte. The 1st data bit of each byte generated and sent by the master or a slave comprises a start of byte (SOB) information. The SOB bit further comprises a data direction exchange information:

SOB=0: start of a data request by the ECU (SOF byte).
SOB=1: MUART byte containing data sent by a slave.

The following 12 bytes are data bytes, that are generated by the two slaves (sensors). All data bytes generated and sent by a given slave conform the data packet of that given slave. The data frame of that given slave comprises the data packet and the two gaps, which are also generated and sent by that given slave.

The data bytes carry information in the communication, while the gaps do not carry any information. The gaps are only used for collision avoidance in the communication frame.

In FIG. 3, the first slave (Sensor 1) transmits one data packet including six data bytes (only the first and last transmission data bytes are shown) and including the gaps, followed by the transmission by the second sensor (Sensor 2) of its data packet including another six data bytes, and the gaps. In this particular example each sensor transmits six data bytes, in praxis this number can also be higher. Slaves do not need to transmit the same number of bytes; each slave may transmit the number of data bytes it needs depending on the application. This can be done by keeping the same time budget for all slaves, where there is no data transmission by a given slave for the rest of the time budget after the requested data has been transmitted by said slave, or it may be taken into account by the algorithm running in all the slaves to calculate gaps accordingly.

For the given example in FIG. 3, the data packet of Sensor 1 are the data bytes 1 . . . 6, with each data byte carrying the SOB bit and 7 data bits. The data frame of sensor 1 comprises the data packet and additionally the gaps GAP1*a* and GAP1*b*. GAP1*a* and GAP1*b* have a given time length based on parameters locally stored in the slave (Sensor 1). The time length or duration of these two gaps is also calculated in the slave (Sensor 1).

The position of the gaps (at start of the frame or at the end or both) may depend in some embodiments on whether the frequency offset of the slave is positive or negative, as it will be explained with reference to FIG. 4. However, in some embodiments, a gap (GAP1*a*) is always included before the transmission of the first data byte from the first transmitting slave (Sensor 1) as shown in the figure. This allows reducing the influence of any source of noise or bouncing between the master and slave (e.g. a physical layer or layers, as it will be explained with reference to FIG. 6). In some embodiments, if there is a gap after the data packet of the last slave, the master may respect the last gap or not, in which case the master may initialize a new request after the data has been received from the last slave, with no need to respect the last gap. In other embodiments, e.g. in temperature sensing systems where the transmission time is short compared to the detectable change of temperature, the master may include a predetermined time period before starting a new data/synch request, in order to save energy and regardless of the presence of a last gap. In alternative embodiments, e.g. in applications with fixed frame rate (with a pulse repetition rate of synchronization/address SYNC/ADR bit), the repetition rate is in most cases based on PWM-generated signals. As these signals are difficult to be rest "on the fly", a very last gap at the end of the communication can be left if present, in order to avoid data collision of the last slave data packet running into the master SYNC/ADR.

Similarly, a second sensor (Sensor 2) transmits its data packet after the end of the transmission of Sensor 1. The data packet of Sensor 2 comprises the data bytes 1 . . . 6. The data bytes carry the SOB bit and 7 data bits. The data frame of Sensor 2 comprises the data packet and additionally the gaps GAP2*a* and GAP2*b*. GAP2*a* and GAP2*b* are also calculated by sensor 2 based on parameters locally stored in sensor 2.

It might be understood that one master and several slaves can be connected on the bus. Any number of slaves may be connected, only limited by for example thermal effects of the slave oscillators which may increase the probability of collisions, and considering efficiency of communication in terms of raw bits per time unit, with high numbers of slaves/bytes. As the number of slaves increase, they have to respond in a communication frame with increasing number of gaps (and, in accordance with some embodiments, increasing gap length) so in practice an optimal number of slaves can be used depending on the speed required. In a preferred embodiment, up to 8 slaves may be connected to the master, so the transmission can be done with high speed and including gaps in the data packet of each slave. It might further be understood, that a data packet might comprise several bytes. In a preferred embodiment, it might be 1 . . . 6 bytes.

In some embodiments, these gaps are generated and included in a data packet by the MUART of a given slave, with the time length of the gaps being calculated by that given slave based on parameters locally stored in that given slave.

Other alternatives may be used, such as PLL for data recovery with high implementation cost and either SYNC trainings sequence or Manchester code. However, data efficiency is reduced. Fully bi-directional slave interface can be used, but higher accuracy for tighter frequency offsets are required in each slave. Alternatively, each slave may be triggered, which causes loss of data efficiency. A remote trigger method can be used, but slower data speeds are required, and it may result in high recessive bit-width variations and different propagation delays for raising/falling edges.

The gaps may be generated and introduced in the data packet taking into account parameters based on, for example, the frequency of the slave clock, such as the frequency offset. These parameters may be provided (204) during calibration.

Figure 4A:
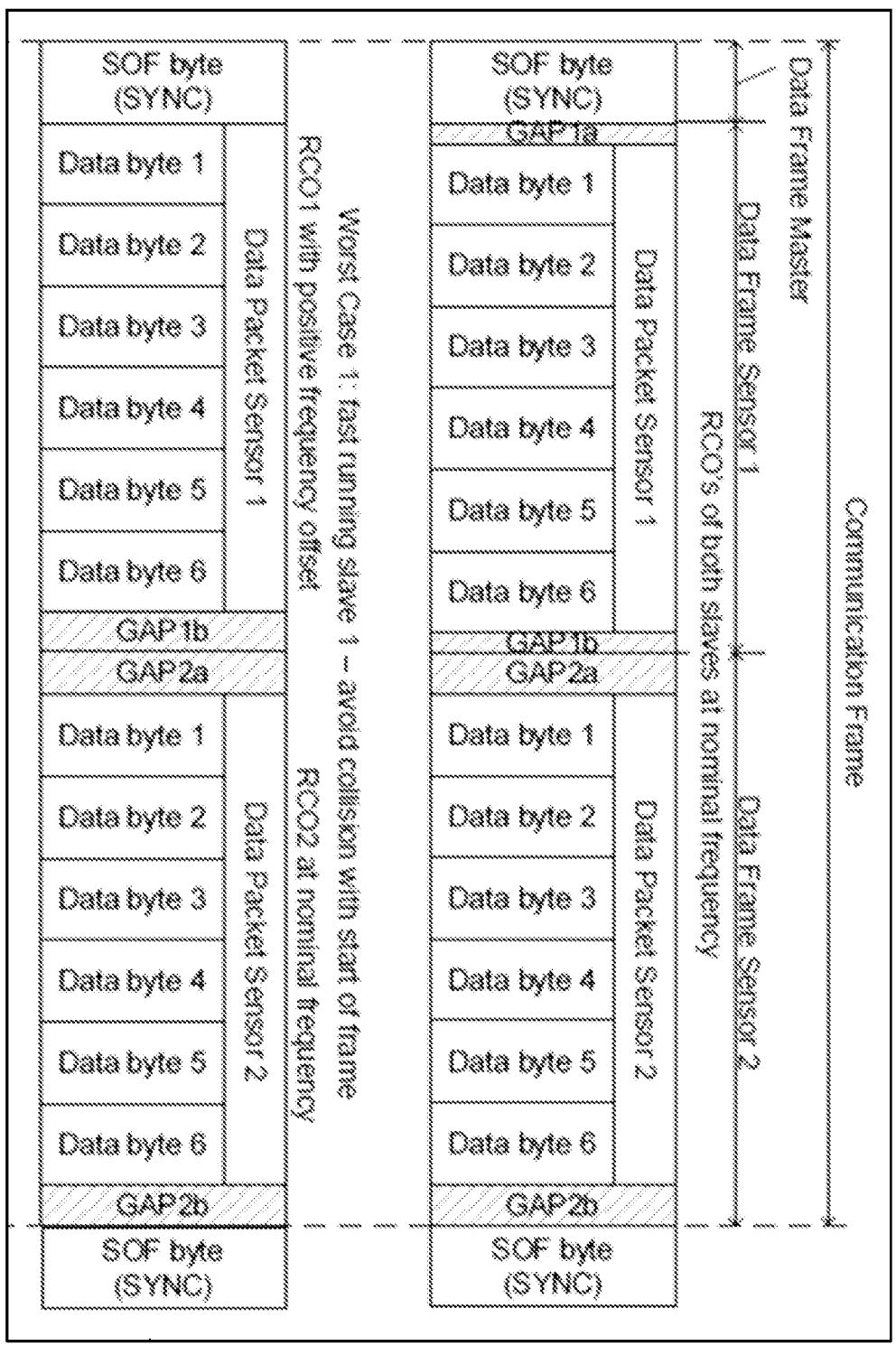
FIGS. 4A and 4B illustrate a communication frame with worst case considerations for a two slave example with nominal, slow and fast running oscillators.

FIG. 4 shows a complete communication frame comprising a start of frame (SOF) indication sent by the master followed by a sequence of data frames sent by each slave, including gaps and their respective data packets ("Data Packet Slave 1 and Data Packet Slave 2, which may be the data packet of sensors). The data frames of only two slaves are shown, for four cases (the present invention not being limited to two slaves):

FIG. 4A shows the case of the resistor capacitor oscillator (RCO) of both slaves at nominal frequency, at the right side of the figure.

FIG. 4A shows the worst-case scenario for the first slave with an RCO running at positive frequency offset (thus, being a "fast slave") and a second slave with RCO at nominal frequency.

Figure 4B:
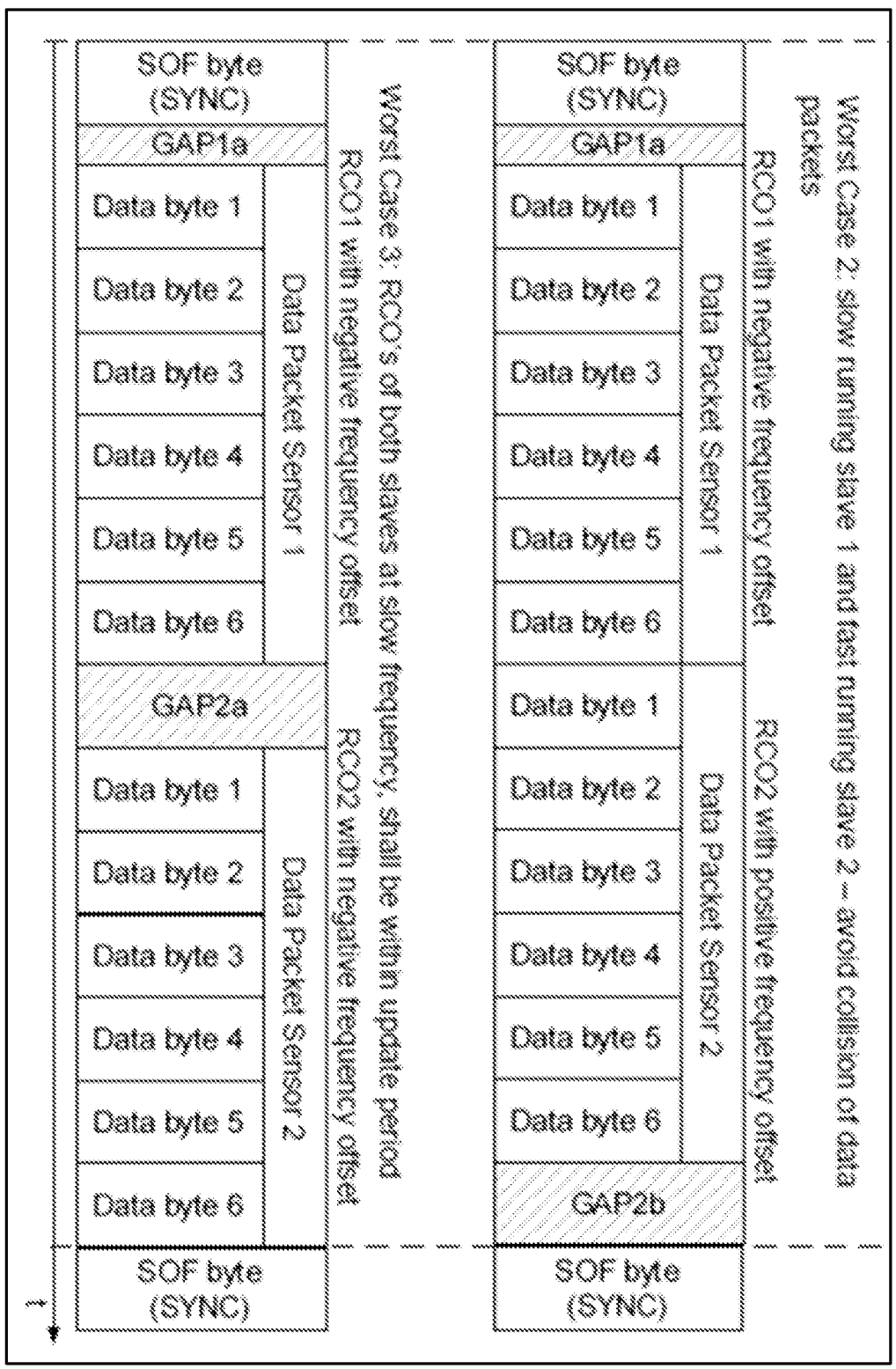

FIG. 4B shows the worst-case scenario for the first slave with an RCO running at negative frequency offset (thus, being a "slow slave") and a second slave with RCO at positive frequency offset (thus, being a "fast slave"), at the right side of the figure.

FIG. 4B shows the worst-case scenario for the first and second slaves with an RCO running at negative frequency offset (being both slaves "slow slaves").

Other model cases may be envisaged. The frequency of each slave may be different.

Each data frame comprises a data packet, which may consist of one or more UART bytes. Time of transmission and the time slots may be determined by time-division multiple access (TDMA), and in embodiments of the present invention, one or more gaps of defined duration (or length in time) are inserted in every data frame of each slave. Gap length and TDMA time slot are calculated in terms of RC-oscillator clock cycles, based on one or more of the following parameters, e.g.:

slave-ID expected RC-oscillator frequency tolerance

RC oscillator frequency

UART baud rate (speed of transmission)

UART format (number of bits including start and stop indication: 8N1, 8N2, ... )

physical layer TX/RX delay number of UART bytes in a data packet

These parameters are stored in a memory, e.g. a non-volatile memory in each slave.

For example, at least the start of the gap is based on the ID of the slave, which determines the moment of start of transmission of the packet including one or two gaps. Hence, it is clear that each parameter determining the gap is different in each slave. Additionally, the clocking system of each slave may be in practice different from each other, especially when they are inexpensive oscillators.

The following requirements are set to the defined time slots, in what the gaps are inserted in the data frame of each slave:

A fast running slave (positive frequency offset) shall not access the bus during the last stop bit of start of frame (SOF) indication. This will be covered by GAP1*a* between the start of frame (SOF) byte and the first data packet.

A fast running slave shall not access the bus before a slow running sensor (negative frequency offset) has finished its transmission/bus access. This is covered by GAP1*b* and GAP2*a* (respectively GAP2*b* and GAP3*a*, GAP3*b* and GAP4*a*, ... ) between each sensor data packet.

The sum of all slow running sensors shall finish their transmission within a communication frame. This will be covered by (last) GAPN*b*. The next communication frame initiated by the SOF byte sent by the master starts a new cycle.

In some embodiments, the unique slave ID is combined with the oscillator frequency or a related parameter (such as the offset), which may be unique also for each slave. Thus each slave can correctly place the gap at the right moment, at the proper duration, and transmit the data at the right moment. The gap is based on a number of local oscillator clock ticks and the ID slave number.

In some embodiments of the present invention, the duration of gaps are tailored to increase with the actual time in a communication frame (Tgap1<Tgap2<Tgap3< Tgap4<... ) with Tgap1=GAP1*a*, Tgap2=GAP1*b*+GAP2*a*, Tgap3=GAP2*b*+GAP3*a* ... , because the data frame sent by the master has a pulse falling edge as fix-point of reference for a synchronization. It is an advantage that the last slave or slaves has enough room to provide transfer with no collision.

In some embodiments, the increase of the duration of the gaps with the actual time is done under use of the timer counter and the calculation by each slave (e.g. by a processing unit in each slave). This is provided by the iterative calculation which may use at least the slave ID.

The process might be seen as cumulative effect of timing error, starting with the falling edge of SYNC/ADR by the master until start of slave transmission. This cumulative error increases over time. Therefore, the gaps also have to be increased over time (number of slaves) to compensate the timing error. This is exactly part of the iterative gap calculation of FIG. 8.

The starting point in time of each sensor's transmission may be calculated using a recursive algorithm. This algorithm may be adapted to the particular master-slave system. For example, in some embodiments including a physical layer, the delays from the layer may be taken into account. Thus, starting point of each sensor may be referenced to the local oscillator clock frequency of each slave respectively the number of clock cycles.

In the following, a second aspect of the present invention will be presented as a control system. A particular implementation of the system and of the algorithm will be shown.

In a second aspect of the present invention, a master-slave control system is provided, in which the data transmission from slaves to the master has reduced EMC issues and does not suffer from data collision or self-collision. There is no need of adding means of synchronization in the slaves, e.g. no need of phase-locked loop (PLL), for example.

Although the master is assumed to run on a stable time base (for example a highly precise oscillator such as a crystal oscillator or dielectric resonator), a simple RC-oscillator can be used in each slave. In fact, any inexpensive oscillator, even oscillators with poor frequency stability compared to crystals, can be used in each slave. Additionally, simplified slaves can be used, because there is no need for a full receiver to be implemented.

Figure 5:
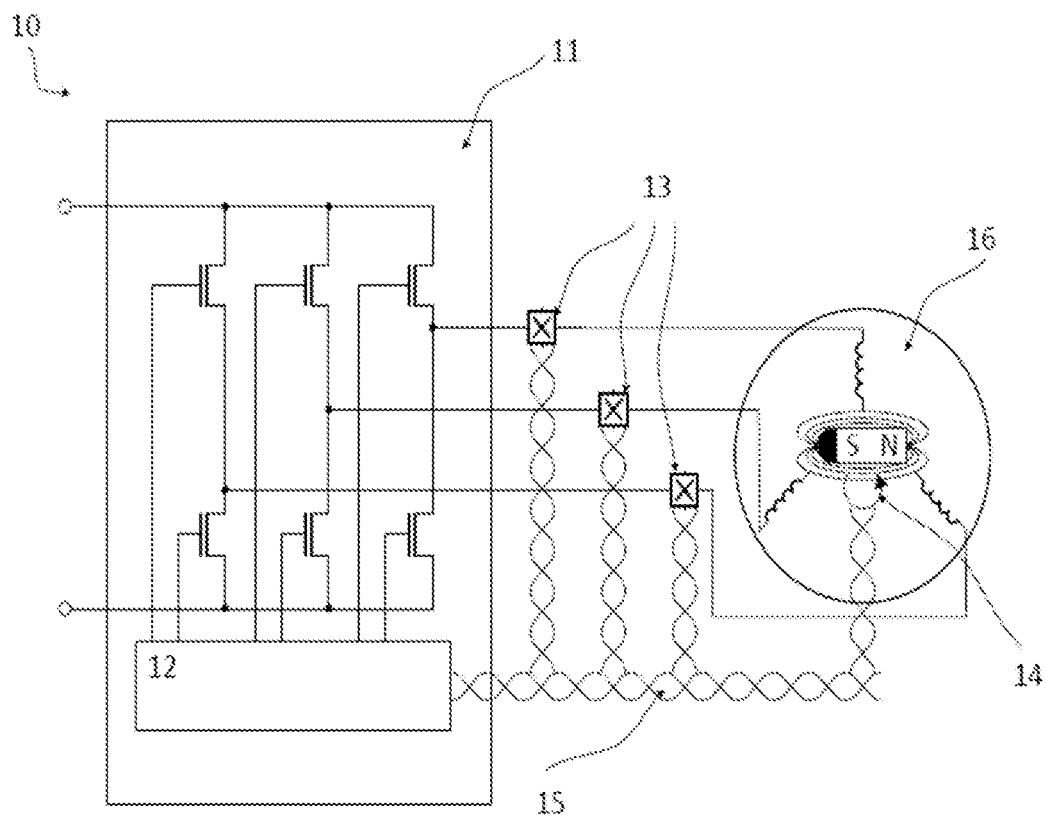
FIG. 5 and FIG. 6 illustrate respectively a control system and a master-slave system implemented as a sensor system in accordance with embodiments of the present invention.

As explained earlier, the usual trend is to add elements in communication systems to improve synchronization of the bit transmission and clocking, for example by adding communication between slaves or the like, thus aiming at solving the problem of slipping between the master sampling events and the Tbits of the slaves, as shown in FIG. 5. The present system does not need these elements, and although the sensors are not synchronized and there may be a limited shift between the data bit transmission and the sampling event, it is limited to the byte transmission. The elements of the system in accordance with embodiments of the present invention ensure adding gaps between data packets which "reset" the mismatch and avoids data collision, taking into account parameters stored in the slave, for example taking into account the slave frequency offset.

These elements include, for example, a software program which is adapted to carry out the method of the first aspect of the present invention when executed in a processing unit of a slave connected to a master. The software program may be adapted to read the input of the slave from a master so, upon receipt of a suitable signal from the master, the slave can send data to the master in accordance with the method of the present invention. The type of data to be sent may be collected from other elements of the slave. In some embodiments, the master may send an order to a set of sensors acting as slaves that triggers them to send the collected measurement data to the master, e.g. current, magnetic field measurement data, etc. The present invention is not limited by these examples, and it may be other types of sensing data, or even other types of data.

In an aspect of the present invention, a system of communication between a master and slave is provided. The system may comprise a master and one or more slaves, for example the system may be a sensor system, for example it may be part of a control system. The slave or slaves are adapted to communicate with the master by generating and transmitting a slave data frame including a data packet of at least one data byte and at least one gap of variable time length comprising no information in the slave data frame at the beginning of said slave data frame (before the beginning of the first data byte of said data packet) or at the end of said data packet (after the end of a last data byte of said data packet). The gaps have a time length dependency based on parameters locally stored in each of said at least one slave. The master is adapted to receive the slave data frame. In some embodiments, data transmission from slave to master is triggered by an order sent by the master to the slave, e.g. broadcasted to all slaves.

FIG. 5 shows an exemplary control system (10) in accordance with embodiments of the present invention. A motor controller (11) incorporates for instance an electronic control unit ECU (12), which provides control signals to power a device. In this particular example, the ECU drives a brushless DC (BLDC) motor (16) and several slaves (13, 14, 23) such as sensors are connected to the ECU (12). The slaves (13, 23) may for instance be current sensors (13) adapted to sense the phase currents of the BLDC motor. Further, a torque sensor or a rotor position sensor (14) might be connected to the ECU as well. The ECU (12) and the sensors (13, 14) form a sensor system (20) within the control system (10). The sensors and the ECU are interconnected via a wiring harness (15) and form a differential asynchronous multiple sensor bus. In this bus architecture the ECU fulfils the role of master (12), while all the sensors perform slave functions. However any other types of master control units and slaves can be used.

As known from usual master/slave bus architectures, any communication is always triggered by the master. This trigger can for instance be a sync pulse as known in the art (for example as described in the publication US2019/0028217A1, in particular paragraphs [0029]-[0038]) or any other initialization means. In particular for TDMA the time slots are referenced to a trigger event derived out of a synchronization byte (e.g. start of frame (SOF) byte) generated by an ECU. It might for instance be a falling edge defined by the SOF frame sent as a request of information by ECU as in FIG. 3. Triggering is not the focus of the present invention.

Figure 6:
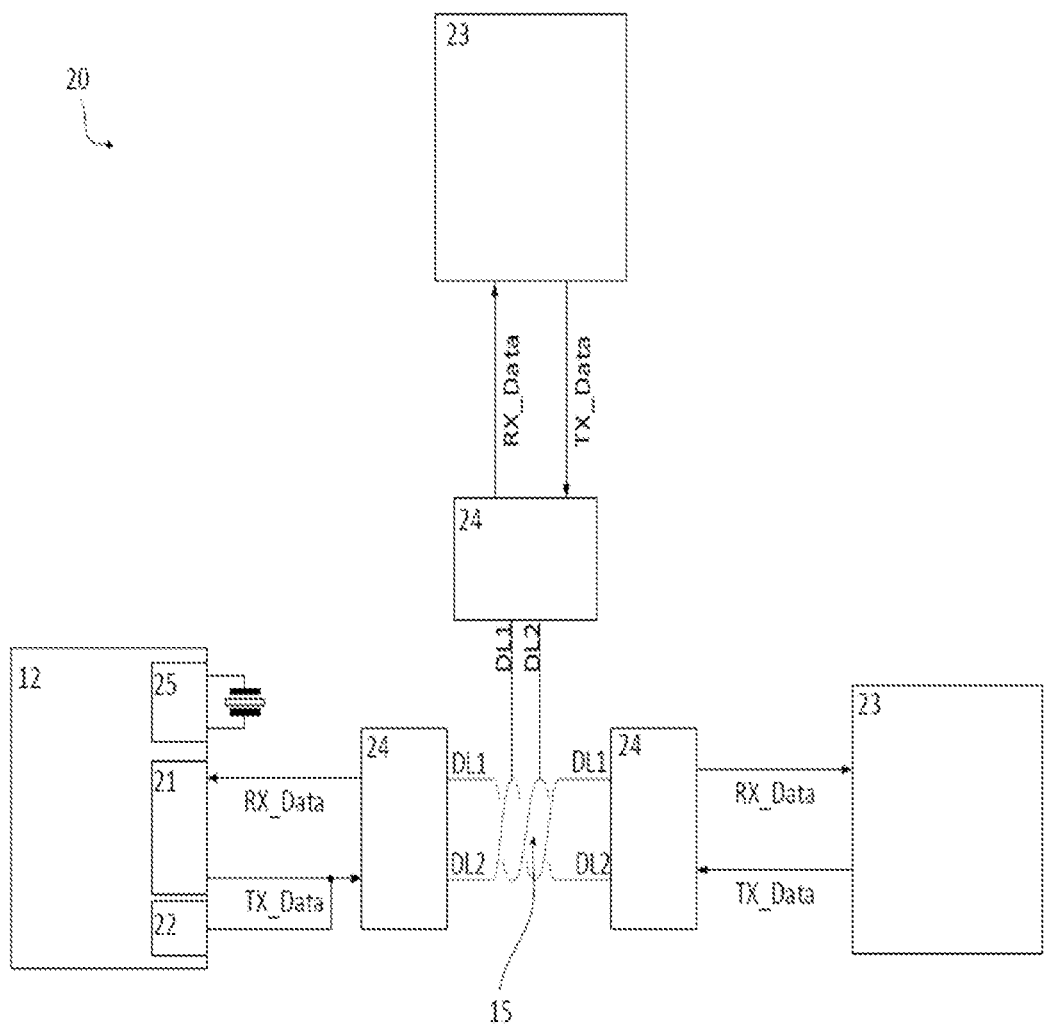

FIG. 6 displays a sensor system (20) in accordance with embodiments of the invention. It includes an ECU (12) as master, and slaves (23). In some embodiments, the system may further comprise a physical layer (24), e.g. a physical layer per slave and one for the master.

The physical layer itself may comprise a signal converter, which is used to convert signals RX_Data, TX_Data to DL1 and DL2. The physical layer is connected via the Data Lines DL1 and DL2 to a wiring harness (15). In some embodiments, DL1 and DL2 may carry differential signals, which are very robust for disturbances on the wiring harness. Disturbances might be for instance electromagnetic disturbances. The physical layer has a common characteristic, that it includes a delay in the communication between the master and a slave. This delay is usually known and it can further be used in calculations as a maximum delay that a physical layer might cause. The physical layer might be a transceiver, such as a CAN transceiver, or a RS-485 layer, the present invention not being limited thereto.

More in general, in bi-directional (half-duplex) multiple sensor bus system, the delay characteristics of the physical layer has to be considered. The particular physical layer used from the available layers has to be taken into account. For example, a CAN-bus standard defines RX-, TX- and loop-back delay and a possible shift of rising edge at transition from dominant to recessive state, while RS-485 requires defined TX-RX- and RX-TX-turn-around times to switch data direction of every single node.

Several physical layers might be connected via DL1 and DL2 to the wiring harness (15), which further convert these signals again to RX_Data, TX_Data and provide them to slaves (23) in this sensor system (20). However, the presence of physical layers is optional. For example, physical layers may be avoided if there is only one sensor connected to the ECU and if the wire harness is very small and only short interconnections are present. Such a configuration is certainly possible, e.g. if the ECU and the sensor are located on one and the same printed circuit board (PCB). The present invention allows to reduce collisions due to signal bouncing or the like, even in this case.

In some embodiments of the present invention, the ECU (12) comprises e.g. a UART (21) and a Synchronization (Synch) Pulse Generation Unit (22). The UART provides a Transmission Data Signal TX_Data to a physical layer (24). The UART further receives a Receive Data Signal RX_Data from the physical layer. The Sync Pulse Generation Unit generates e.g. a sync pulse on the TX_Data line in order to start a communication from the ECU. The ECU further comprises a high-precision oscillator, so that the UART and the Sync Pulse Generation Unit work with a high precision. The tolerance of such an oscillator might be for instance +/−0.02% of the nominal oscillator frequency. In some embodiments, the oscillator is for instance a crystal oscillator being the clock (25) of the master.

Only two sensors (23) have been shown in FIG. 6. In preferred embodiments, the number of sensors might be between 1 and 8, but might also be higher. The sensors (slaves) have usually different sensor identification numbers (ID) in order to establish a communication to the ECU (master) in a right way without conflicts. In case there is only one slave, the ID may not be used to provide the gaps. For example, the oscillator frequency, its offset, or the like may be used to calculate the duration and position of the gap or gaps. The gaps may still be provided to reduce chance of EMC disturbances, for example due to signal bouncing, e.g. due to the presence of the physical layer, to overcome delays in the communication line (wiring, delays in the receiver or transmitter, etc.). In the particular case where a physical layer (e.g. a CAN transceiver) is used, bus access and bus transfer delays will be present, even for a single slave setup. The present invention allows dealing with these by adding the gaps, instead of a complex physical layer including separate RX/TX lines in full duplex system.

Figure 7:
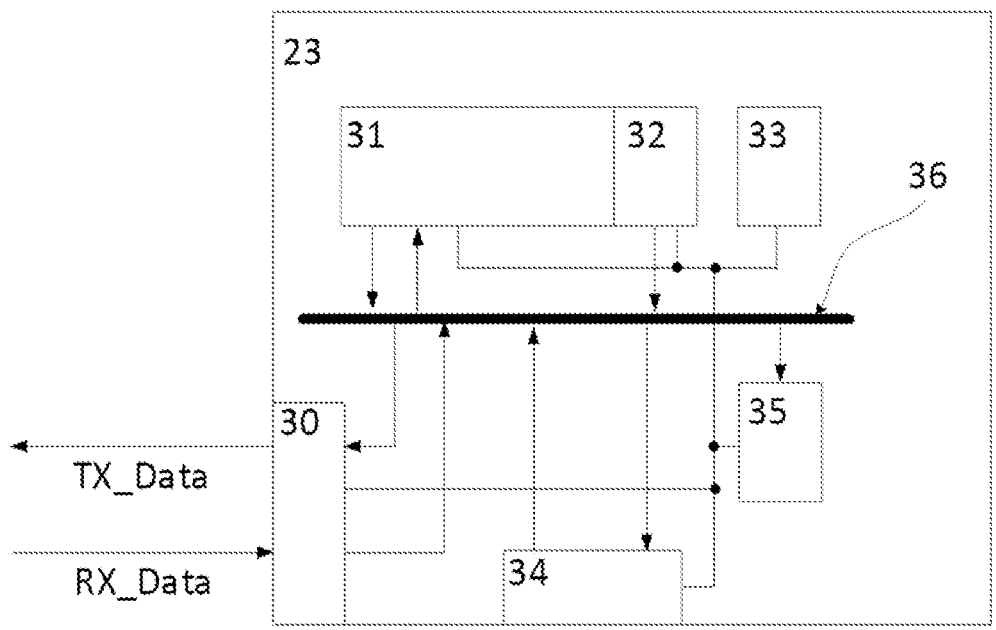
FIG. 7 illustrates a slave in accordance with embodiments of the present invention.

FIG. 7 shows a slave (23) being e.g. a sensor according to embodiments of the invention. The sensor can for instance be any suitable sensor, such as a current sensor or a torque sensor as mentioned earlier. The sensor can sense or measure physical parameters and might need to transmit this data at a given moment in time. The sensing aspect of the sensor as such is not important and it will therefore not be worked out further.

For the scope of data transmission, the sensor is connected to a bus via a communication interface. The communication interface can for instance be a modified UART (MUART) (30).

Besides its natural function to receive and to transmit data bytes to a bus, it is further arranged to add also gaps of a variable duration in the communication in accordance with embodiments of the invention. A gap may be defined in this frame as a period in the transmission sequence of a given slave when there is no active signal on the transmission line TX_Data of that sensor. A gap has a starting point and an end point in time, defining its duration or time length.

In the particular embodiment of FIG. 7, the sensor (23) acting as a slave further comprises a calculation and processing unit (31) which may be a programmable controller, processor, microprocessor, or the like. The processing unit is adapted to calculate or determine, based on predetermined parameters, the starting point and the end point in time of the gaps which will be included in the communication, e.g. by the MUART. In some embodiments, A time counter (32) delivers a time base which is further used by the calculation and processing unit (31) for calculating the gaps. The time counter (32) may be included in the processing unit (31), although the present invention is not limited thereto. In some embodiments, the MUART can be split in two blocks, one UART and one Multifunction. In this case, the Multifunction includes the gaps with information from the counter. UART receives an enable bit or signal from the Multifunction block which calculates the gaps. The next slave frame starts after the end of transmission of the previous slave or the end of its second gap, and UART receives again a signal to activate.

The sensor includes a memory (33) arranged to receive and store the predetermined parameters for calculation of the gaps. In some embodiments, the memory may be a non volatile and (re)programmable memory (33), as for instance an read-only memory (ROM), electrically erasable and programmable memory (EEPROM, Flash) or a one time programmable memory (OTP).

In some embodiments of the present invention, the predetermined parameters might be received and provided to the non volatile and programmable memory of the slave (e.g. the sensor) during one or more calibration steps under use of the MUART. In some embodiments, the predetermined parameters may be provided by a calibration interface (34) of that sensor. The present invention is not limited to these examples. For example, the parameters may be provided externally. For example, a resistor coding may be used. For example, a first PCB may include a resistor of 100 Ohm connected to the slave (23) being a sensor, while PCB 2 may include a different resistor of e.g. 200 Ohm, and so on. The sensor, by means of an ADC, may measure the resistance value and derive of that its ID. A different implementation using capacitors with different values of capacitance can be used. In embodiments of the present invention, the slave may comprise an input to introduce the ID. For example, a slave in an IC may include 3 pins where active voltage levels (000, 001, 011, etc.) can be applied, with 1 corresponding to the supply of the slave and 0 to ground, so the binary code of the IDs can be set externally.

In some embodiments, the sensor is arranged as an Integrated Circuit (IC). The IC might further have an architecture of e.g. a microcontroller in what all said components of the sensor exchange information, addresses and data via an internal bus (36).

In some embodiments, at least some of these parameters are provided during a calibration step, for example in the production line of a semiconductor manufacturer. Another part of said parameters might be provided at end of line programming of the sensor system provider. Thus, few calibration steps, for example only one calibration step, might be possible.

In some embodiments of the invention, part of said parameters might be stored already during a manufacturing step of a semiconductor manufacturer in a Read Only Memory (ROM) (not shown in FIG. 7).

In some embodiments, the slave comprises an inexpensive oscillator being the clock (35) of the slave, such as an RC oscillator, which provides a clock to all components to the system.

For example, an uncalibrated low precision RC oscillator might have a tolerance of +/−60% or +/−30% or +/−15% of the nominal target frequency. This variation can be reduced to +/−5% or +/−2.5% or +/−1% tolerance by calibration. However, the tolerance of the RC oscillator of a slave with this calibration result is still significantly higher as the tolerance of the crystal oscillator of the ECU with e.g. +/−0.02%.

The RC oscillator is arranged to be calibrated during a calibration step. Although the RC oscillator may be a low precision oscillator (e.g. with a precision tolerance of +/−2.5% or higher), the presence of gaps in the frame reduces or avoids data collision with no need to complex communication between slaves, or complex synchronization systems.

Figure 8A:
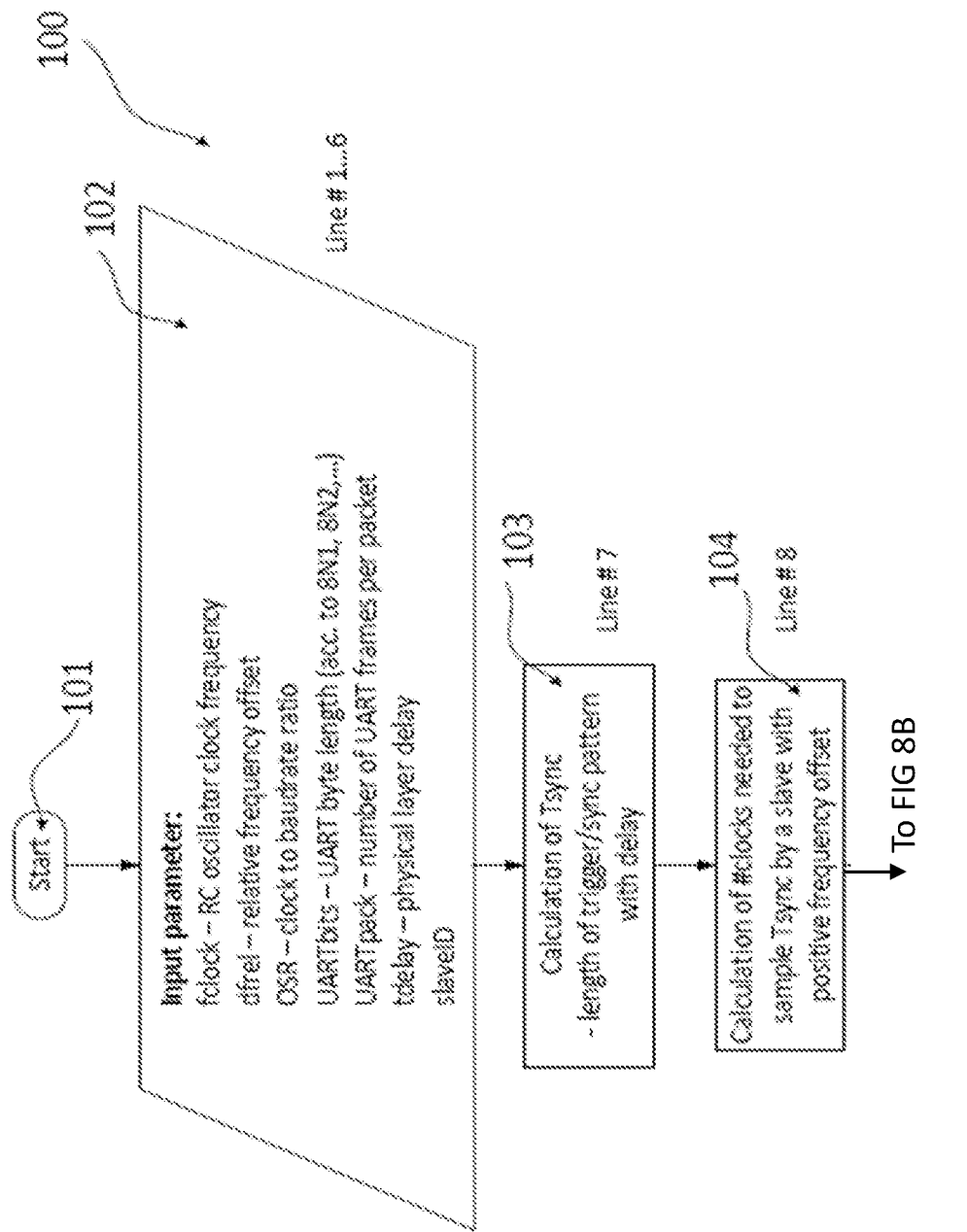
FIGS. 8A and 8B illustrates an iterative calculation scheme for the gap calculation performed in each slave.
Figure 8B:
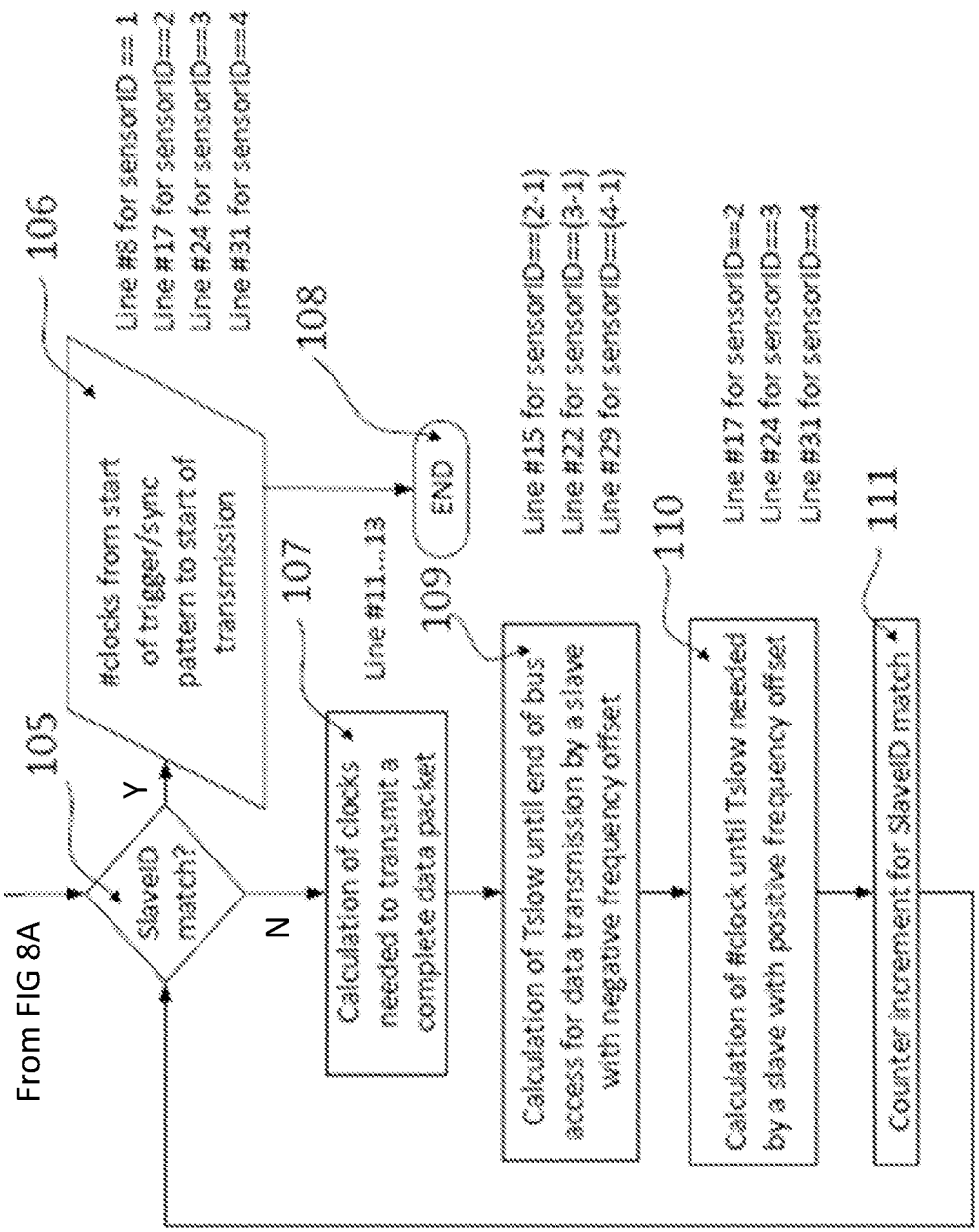

A particular algorithm implementation adapted to the slave system and control system of the examples of the previous figures is presented in the following table and related iterative calculation scheme as shown in FIG. 8A and FIG. 8B, for the gap calculation performed by each slave. In this particular example, the implementation is done on a sensor system but it could be implemented to any other suitable slave system.

The algorithm (100) to determine start of data transmission of each sensor includes an iterative loop. The number of consecutive iterations depends on the number of sensors attached to the bus. This algorithm may be executed in the slave, for example in a processing unit of the slave. Table 1 gives concrete examples of interface parameters that are part of the algorithm, in order to offer better understanding of the algorithm. Each step in the operation flow of the calculation (100) is referred to the line number in table 1 with corresponding results. The definition of the protocol is given by 8N1, 8N2 . . . defining the data bits, parity bit and whether it is present or not, etc., as known in the art.

TABLE 1

Calculation examples of parameters locally stored in each slave (sensor) including iterative loop

| Line # | UART format | 8N1 | 8N1 | 8N2 | 8N2 | 8N1 | 8N1 | 8N1 | 8N2 | 8N1 |
|---|---|---|---|---|---|---|---|---|---|---|
| 1 | DataRate nominal [Mbit/s] | 2.857 | 4.000 | 2.857 | 4.000 | 2.800 | 4.300 | 3.750 | 2.000 | 2.000 |
| 2 | Nominal RCO frequency [MHz] | 20 | 20 | 20 | 20 | 44.8 | 68.8 | 60 | 20 | 20 |
| 3 | RCO frequency offset [%] | 2.5 | 2.5 | 2.5 | 2.5 | 2.5 | 2.5 | 2.5 | 2.5 | 2.5 |
| 4 | bits per UART byte | 10 | 10 | 11 | 11 | 10 | 10 | 10 | 11 | 10 |

TABLE 1-continued

Calculation examples of parameters locally stored in each slave (sensor) including iterative loop

| Line # | UART format | 8N1 | 8N1 | 8N2 | 8N2 | 8N1 | 8N1 | 8N1 | 8N2 | 8N1 |
|---|---|---|---|---|---|---|---|---|---|---|
| 5 | RX propagation delay [us] | 0.175 | 0.175 | 0.175 | 0.175 | 0.175 | 0.175 | 0.175 | 0.175 | 0.175 |
| 6 | number of UART bytes within a sensor data packet | 6 | 6 | 6 | 6 | 6 | 6 | 6 | 6 | 6 |
| 7 | SYNC Byte length + Rx delay [us] | 3.675 | 2.675 | 4.025 | 2.925 | 3.746 | 2.501 | 2.842 | 5.675 | 5.175 |
| 8 | Sensor1 start after [RCO cycles] | 76 | 55 | 83 | 60 | 173 | 177 | 175 | 117 | 107 |
| 9 | Sensor1 slow RX delay [us] | 4.072 | 2.996 | 4.431 | 3.252 | 4.136 | 2.814 | 3.166 | 6.175 | 5.662 |
| 10 | Sensor1 fast [us] Has to be greater than nominal SYNC Byte length + Rx delay [us] | 3.707 | 2.683 | 4.049 | 2.927 | 3.767 | 2.510 | 2.846 | 5.707 | 5.220 |
| 11 | Sensor transmission [RCO cycles] | 420 | 300 | 462 | 330 | 960 | 960 | 960 | 660 | 600 |
| 12 | Sensor slow [us] | 21.538 | 15.560 | 23.867 | 17.098 | 22.153 | 14.486 | 16.585 | 34.021 | 30.944 |
| 13 | Sensor fast [us] | 20.488 | 14.634 | 22.537 | 16.098 | 20.906 | 13.613 | 15.610 | 32.195 | 29.268 |
| 14 | Sensor1 data end [RCO cycles] | 496 | 355 | 545 | 390 | 1133 | 1137 | 1135 | 777 | 707 |
| 15 | Sensor1 slow 2*Rx delay[us] | 25.786 | 18.555 | 28.299 | 20.350 | 26.289 | 17.300 | 19.752 | 40.196 | 36.606 |
| 16 | Sensor1 fast [us] | 24.195 | 17.317 | 26.585 | 19.024 | 24.673 | 16.123 | 18.455 | 37.902 | 34.488 |
| 17 | Sensor2 start after [RCO cycles] | 529 | 381 | 581 | 418 | 1208 | 1220 | 1215 | 825 | 751 |
| 18 | Sensor2 start slow [us] | 27.128 | 19.888 | 30.145 | 21.786 | 28.006 | 18.537 | 21.119 | 42.658 | 38.863 |
| 19 | Sensor2 start fast [us] Has to be greater than Sensor2 slow 2*Rx delay [us] | 25.805 | 18.585 | 28.341 | 20.390 | 26.307 | 17.300 | 19.756 | 40.244 | 36.634 |
| 20 | Sensor2 data end [RCO cycles] | 949 | 681 | 1043 | 748 | 2168 | 2180 | 2175 | 1485 | 1351 |
| 21 | Sensor2 slow [us] | 48.667 | 34.923 | 53.487 | 38.359 | 49.634 | 32.499 | 37.179 | 76.154 | 69.282 |
| 22 | Sensor2 slow 2*Rx delay [us] | 49.017 | 35.273 | 53.837 | 38.709 | 49.984 | 32.849 | 37.529 | 76.504 | 69.632 |
| 23 | Sensor2 fast [us] | 46.293 | 33.220 | 50.878 | 36.488 | 47.213 | 30.913 | 35.366 | 72.439 | 65.902 |
| 24 | Sensor3 start after [RCO cycles] | 1005 | 724 | 1104 | 794 | 2296 | 2317 | 2309 | 1569 | 1428 |
| 25 | Sensor3 start slow [us] | 51.713 | 37.303 | 56.790 | 40.893 | 52.739 | 34.716 | 39.645 | 80.637 | 73.406 |
| 26 | Sensor3 start fast [us] Has to be greater than Sensor3 slow 2*Rx delay [us] | 49.024 | 35.317 | 53.854 | 38.732 | 50.000 | 32.856 | 37.545 | 76.537 | 69.659 |
| 27 | Sensor3 data end [RCO cycles] | 1425 | 1024 | 1566 | 1124 | 3256 | 3277 | 3269 | 2229 | 2028 |
| 28 | Sensor3 slow [us] | 73.077 | 52.513 | 80.308 | 57.641 | 74.542 | 48.852 | 55.880 | 114.308 | 104.000 |
| 29 | Sensor3 slow 2*Rx delay [us] | 73.427 | 52.863 | 80.658 | 57.991 | 74.892 | 49.202 | 56.230 | 114.658 | 104.350 |
| 30 | Sensor3 fast [us] | 69.512 | 49.951 | 76.390 | 54.829 | 70.906 | 46.469 | 53.154 | 108.732 | 98.927 |
| 31 | Sensor4 start after [RCO cycles] | 1506 | 1084 | 1654 | 1189 | 3440 | 3470 | 3459 | 2351 | 2140 |
| 32 | Sensor4 start slow [us] | 77.406 | 55.765 | 84.996 | 61.149 | 78.930 | 51.904 | 59.303 | 120.739 | 109.919 |

TABLE 1-continued

Calculation examples of parameters locally stored in each slave (sensor) including iterative loop

| Line # | UART format | 8N1 | 8N1 | 8N2 | 8N2 | 8N1 | 8N1 | 8N1 | 8N2 | 8N1 |
|---|---|---|---|---|---|---|---|---|---|---|
| 33 | Sensor4 start fast [us] Has to be greater than Sensor4 slow 2*Rx delay [us] | 73.463 | 52.878 | 80.683 | 58.000 | 74.913 | 49.206 | 56.244 | 114.683 | 104.390 |

The algorithm (100) calculates the number of clocks needed to span the time from the reference point, which might be the first edge of the master's communication packet, to the sensor's start of transmission. A fast running sensor with positive frequency offset determines the beginning of a gap (i.e. beginning of GAP1a, GAP2a, . . . ) at calculated clock numbers. On the other hand, it might be seen that a slow running sensor with negative frequency offset determines the end of the gap (i.e. end of GAP1a, GAP2a, . . . ) based on the same clock number as calculated by the algorithm (100). The same method applies to calculate start and end of gaps to be inserted at the end of a transmitted data packet (i.e. start and stop of GAP1b, GAP2b, . . . ).

The procedure starts (101) with reading interface parameters (102) from the memory (e.g. EEPROM, OTP, . . . ). The length of the master's data packet is calculated (103) based on the interface parameters. In case an external physical layer (24) is present, an additional delay might be included if applicable. For example, the slave which transmits first may include a gap before transmitting the data packet for taking into account any delay or disturbance introduced by the physical layer. It is also recommended to consider worst case bus configuration with fast running sensors without bus delay and slow running sensors with bus delay. This might introduce additional margin for collision avoidance.

In some embodiments, for example, an additional predetermined bus delay can be introduced for slaves with negative frequency offset, but it may not be introduced for slaves with positive frequency offset. This may be done to compensate for physical layer delay as mentioned earlier (stemming from e.g. bus access time and RX/TX bus delay in CAN transceivers). In some embodiments of the present invention, propagation delay may be considered, and an additional predetermined bus delay can be introduced, regardless of the offset of the slave.

The calculated master data packet time is used to calculate the number of clock cycles which might be needed to sample this period in time by a fast running sensor with positive frequency offset (104).

Then the ID of the slave is compared to the time slot, for example by comparing the ID of the slave to the current loop cycle which reflects the time slot assigned to the slave, until there is a match (105). If the slave (e.g. sensor) is assigned to the first time slot, then SlaveID matches to ID=1 (105), the number of clocks is immediately used to indicate start of transmission of the first sensor (106). The procedure finishes for the sensor with ID=1 (108) at this point. The transmission start of a fast running sensor defines the beginning of GAP1a and the beginning of GAP1b at packet end. The transmission start of a slow running sensor defines the end of GAP1a and the end of GAP1b at packet end.

The derived starting and end points of the gaps are memorized in the nonvolatile and programmable memory (33) or in internal registers. They will be used when the sensor is transmitting.

If the sensor is assigned to another time slot, so the ID is not 1 (SlaveID≠1) (105), the iterative loop process starts. The slave undergoes the following four steps in the iteration:

The number of clocks which the slave needs for transmission of its complete data packet are calculated (107), from the falling edge of the master.

The time period Tslow is calculated (109). Tslow is the period which a slow running slave would need to transmit its complete data packet.

The number of clocks #clock is calculated (110). The parameter #clock is the number of clocks a fast running sensor would need to sample the complete slow running sensor's data packet time, added to the result from any preceding steps (e.g. steps 104, 110 of the preceding iteration).

An internal counter is incremented (111) which generates the next time slot, which is compared (105) again to the SlaveID to obtain whether there is a match or not, thus closing the loop.

The number of clocks #clock is memorized in the memory (33) or in internal registers. They will be used when the slave is transmitting. In particular, they can be used to determine the start of transmission by each slave.

If the slave ID matches with the assigned time slot, the calculated number of clocks is used to indicate its start (106) of transmission and end (108) consecutively the calculation process.

The number of clocks leads again to the starting time point of GAP2a and GAP2b for a fast running sensor and to the end time point of GAP2a and GAP2b for a slow running sensor.

The start of transmission is done within the slave frame. When the start of transmission occurs after the start of the frame, then it is said that a gap is generated before the data transmission. When the transmission is finished before the end of the frame, then the gap is generated after the data transmission. This is determined for each slave when determining Tslow and the number of clocks. As it can be seen, the number of clocks is obtained from summing the complete absolute time for a slow running sensor, but applying the number of clocks for a fast running sensor. It is also noted that, because of the increasing number of clocks in each iteration, a slave with a SlaveID larger than a previous slave will accumulate a larger #clock. In other words, the gap or gaps of each subsequent slave increase in size, in the present exemplary algorithm. This advantageously provides a lower chance of data collision when the number of slaves increase with the potential accumulated de-synchronization. However, the present invention is not limited to the exemplary algorithm.

Concluding, this will also be true for all subsequent calculated SlaveIDs and their time slots (GAPNa and GAPNb).

The algorithm has been explained in FIG. 8 and in Table I assuming that the slaves transmit the same number of bytes. However, different slaves may transmit different number of data bytes as mentioned earlier. In such case, no data transmission is performed for the rest of the time budget after the requested data transmission is finished. Alternatively, the length of data packets can be taken into account for the calculation of the gap, and the algorithm can be adapted. For example the length can be flexibly calculated and stored for each sensor during the calculation (107) of clocks, so the calculation of the gap takes into account the number of bytes. Gaps and data transmission start/end are based on clock pulses counted after the sync pulse from the master is received.

In summary, in the particular exemplary implementation, the present invention not being limited thereto, each slave calculates its communication start in accordance with its ID. The gaps at the beginning of each data frame are established by the given slave during the loop (calculation of clocks (107), calculation Tslow (109)). When the data packet is sent, the given slave finishes sending data, and the next slave does not yet start its data frame. The time it takes between the end of transmission of the given slave and the start of the data frame of the next slave conforms the gap at the end of the data frame of the given slave. In some embodiments, at the end of the communication frame, the gap at the end of the last slave data frame may be disregarded and the master may start a new cycle at the receipt of the last data bit by the last slave.

It is understood that, instead of the iterative calculation scheme, a look-up table-based algorithm might be used. Such table may be based on a parameter matrix stored in a non-volatile memory of each slave and provided to the slave during one or more calibration steps, the calculation and processing unit (31) of each slave might determine the time of the gaps to be included in the data frames of each sensor.

Slave calibration can be performed (204) in a limited number of steps, e.g. one or two. The calibration values can be used in the calculation of the gaps, as shown in FIG. 2.

A preferred embodiment for calibrating might for instance be providing (204) a parameter matrix to the slave in a first calibration step. This step could be performed in the manufacturing line of the sensor supplier or the semiconductor supplier. For example, this can be done in the case of a sensor provided as an integrated circuit (IC).

A parameter matrix can be defined as a number of parameters, where a relationship is defined between several parameters. For instance, the frequency of the clock of the slave, e.g. the RC oscillator frequency, might be stored together with a temperature at which said oscillator actuates at the respective frequency. Instead of storing only one RC oscillator frequency, several RC oscillator frequencies together with a temperature might be stored. The slave may be provided with an internal temperature sensor. For example, it may be provided in the integrated circuit which forms the slave. Depending on the reading of the internal temperature sensor, the suitable RC oscillator frequency might be chosen for that slave, e.g. the oscillator frequency that matches the closest at the measured temperature. Other parameter combinations might also be possible.

For providing (204) the parameters, the calibration may be performed in the manufacturing line of a supplier, e.g. a second calibration step may be performed (204) in the manufacturing line of a system supplier, in which the sensors may be assigned data and addresses. For example, the sensor may only receive the sensor ID number, which is also part of the parameters used for calculating or determining the gaps as previously shown. The advantage of this embodiment for calibrating is the simplicity of this calibration step.

In embodiments of the present invention, only one calibration step is performed, for example in cases where the oscillator drift over temperature is known. However, more than one calibration step can be performed.

For example, it is possible to calibrate at e.g. 150° C. IC temperature. With a known temperature behavior of the oscillator, the frequency at e.g. 25° C. can be calculated. The calculated frequency at 25° C. can be written in the memory.

Optionally, a further step can be performed, for example using a second temperature. For example, it is possible to calculate both at 150° C. and at −40° C. In that case, it is not necessary to know the drift behavior in beforehand to calculate the temperature drift. The values from both calibration points can be taken and the oscillator frequency can be calculated a 25° C. The calculated frequency can be also written in the memory of the chip.

In a third calibration step, e.g. at another manufacturing line at e.g. the sensor system provider, the ID might be assigned.

The calculation of the gaps to be included in the data frames of a communication frame can be performed at several moments in time by the slave. Calibration values can also be taken into account.

It can be performed after each synchronization initiated by the master by sending the SOF byte. Temperature drifts may be advantageously compensated. Additionally, long term drifts of the frequency of the RC oscillator, not included in the tolerance band, can also be compensated.

The calculation could be performed each time after power up of the sensor. This is a preferred embodiment, as this is part of the initialization routine of the sensor.

The calculation can be performed as the slave is powered up for the first time. The calculated gap times are also written to the memory (e.g. the non-volatile memory).

In summary, under use of gaps in data frames transmitted by the slave, a fast communication of e.g. 4 Mbit/s under use of an RC oscillator of e.g. 20 MHz with e.g. +/−2.5% tolerance a data packet of e.g. 6 Bytes per slave can be transmitted to a master running on a crystal oscillator with a tolerance of e.g. +/−0.02%.

It also has been demonstrated that the gaps are dependent on parameters locally stored in each slave in a memory (e.g. an EEPROM). Each slave can use these parameters in order to calculate the gaps under use of an iterative calculation scheme. The parameters have been provided to the slave in one or more calibration steps.

The invention claimed is:

1. A method for communicating between a master and a plurality of slaves comprising generating a communication frame including generating a slave data frame in each of the plurality of slaves, wherein generating the slave data frame comprises
   generating a data packet comprising one or more data bytes and
   generating at least one gap of variable time length comprising no information in the slave data frame at the beginning of said slave data frame before the beginning of the first data byte of said data packet or at the end of said data packet after the end of a last data byte of said data packet, wherein the gaps are calculated based on a time length dependency based on parameters locally stored in each of said plurality of slaves, and transmitting the slave data frame to the master sequentially, wherein the time length of the gap of each subsequent slave is tailored to increase, further comprising obtaining a frequency offset of each slave, subsequently including a predetermined bus delay for slaves with negative frequency offset and not including the bus delay for slaves with positive frequency offset.

2. The method of claim 1 wherein generating the slave data frame comprises generating a first gap of variable time length at the beginning of said data packet and generating a second gap of variable time length at the end of said data packet.

3. The method of claim 1 wherein one of said parameters locally stored in each of said plurality of slaves is a slave ID number being a unique identification of each slave.

4. The method of claim 1 further comprising generating a time base used for calculating the at least one gap, where the timing of the slave data frame is based on a clock with tolerance of a nominal target frequency being under 5%.

5. The method of claim 1 further comprising generating and sending a start of byte information with the first data bit further comprising data direction exchange information.

6. The method of claim 1 wherein the parameters are provided in at least one calibration step.

7. The method of claim 1 wherein generating the slave data frame is performed during initialization routine of the sensor.

8. A non-transitory computer readable medium comprising a software program product which is adapted to carry out the method of the claim 1 when executed in a processing unit of a slave connected to a master.

9. A system for communicating between a master and a plurality of slaves, the plurality of slaves adapted to generate a slave data frame, wherein the slave data frame comprises a data packet comprising one or more data bytes and at least one gap of variable time length comprising no information in the slave data frame at the beginning of said slave data frame before the beginning of the first data byte of said data packet or at the end of said data packet after the end of a last data byte of said data packet, wherein the gaps have a time length dependency based on parameters locally stored in each of said plurality of slaves, the system further comprising a master adapted to receive the slave data frame from each slave sequentially, wherein the system is configured to increase the variable time length of the gap of each subsequent slave, further wherein the system is configured to obtain a frequency offset of each slave, and to subsequently include a predetermined bus delay for slaves with negative frequency offset and not include the bus delay for slaves with positive frequency offset.

10. The system of claim 9 wherein the master comprises a clock with a tolerance of under 0.05% and the slaves comprise a clock with lower precision than the clock of the master, for providing a high speed and cost-efficient system.

11. The system of the claim 9 wherein the plurality of slaves are sensors and the master is a master control unit.

12. The system of claim 9 wherein each of the plurality of slaves is adapted to run a software program product which is adapted to carry out a method for communicating between a master and the plurality of slaves when executed in a processing unit of the slaves connected to the master, wherein said method comprises generating a communication frame including generating a slave data frame in each of the plurality of slaves, wherein generating the slave data frame comprises generating a data packet comprising one or more data bytes and generating at least one gap of variable time length comprising no information in the slave data frame at the beginning of said slave data frame before the beginning of the first data byte of said data packet or at the end of said data packet after the end of a last data byte of said data packet, wherein the gaps are calculated based on a time length dependency based on parameters locally stored in each of the plurality of slaves, and transmitting the slave data frame to the master sequentially, wherein the time length of the gap of each subsequent slave is tailored to increase, further comprising obtaining a frequency offset of each slave, subsequently including a predetermined bus delay for slaves with negative frequency offset and not including the bus delay for slaves with positive frequency offset.

* * * * *